United States Patent
Apostol et al.

(10) Patent No.: US 8,358,589 B2
(45) Date of Patent: Jan. 22, 2013

(54) BUFFER MODULE, RECEIVER, DEVICE AND BUFFERING METHOD USING WINDOWS

(75) Inventors: Florin Apostol, Bucharest (RO); Diana Madalina Craciun, Bucharest (RO)

(73) Assignee: Freescale Semiconductor, Inc., Austin, TX (US)

( * ) Notice: Subject to any disclaimer, the term of this patent is extended or adjusted under 35 U.S.C. 154(b) by 347 days.

(21) Appl. No.: 12/865,140

(22) PCT Filed: Feb. 8, 2008

(86) PCT No.: PCT/IB2008/050463
§ 371 (c)(1),
(2), (4) Date: Jul. 29, 2010

(87) PCT Pub. No.: WO2009/098542
PCT Pub. Date: Aug. 13, 2009

(65) Prior Publication Data
US 2010/0329141 A1    Dec. 30, 2010

(51) Int. Cl.
*G01R 31/08* (2006.01)
(52) U.S. Cl. ........................ 370/252; 370/498
(58) Field of Classification Search .............. 370/213, 370/252–253, 345–350, 395.1–427, 508–545
See application file for complete search history.

(56) References Cited

U.S. PATENT DOCUMENTS

| 6,684,273 | B2 | 1/2004 | Boulandet et al. |
| 6,862,298 | B1 | 3/2005 | Smith et al. |
| 6,898,213 | B1 | 5/2005 | Shimelmitz et al. |
| 2003/0152094 | A1 | 8/2003 | Colavito et al. |
| 2004/0002262 | A1 | 1/2004 | Murayama et al. |

FOREIGN PATENT DOCUMENTS

| WO | 01/33787 A | 5/2001 |
| WO | 2005/003880 A | 1/2005 |

OTHER PUBLICATIONS

Zarlink Semiconductor: "Advanced PDV Monitoring on MT922x0" Application Note, Online, Feb. 2003, pp. 1-9.
International Search Report and Written Opinion correlating to PCT/IB2008/050463 dated Nov. 14, 2008.

*Primary Examiner* — Ricky Ngo
*Assistant Examiner* — Iqbal Zaidi (57) ABSTRACT

A buffer for managing the order of data packages arriving at the buffer, wherein the buffer includes a first window, having a predetermined size defined by a first and a second extreme, and the first window is included within a second window. The buffer includes a filter for determining the time stamp of an arriving data package to determine if the arriving data package has an expected location included inside or outside the first window based on the time stamp. The buffer also includes a buffer module for locating the arriving data package in the expected location or for moving the first window by a predetermined distance to a position, without changing the size of the first window, to accommodate the expected location.

20 Claims, 9 Drawing Sheets

BUFFER MODULE, RECEIVER, DEVICE AND BUFFERING METHOD USING WINDOWS

FIELD OF THE INVENTION

This invention relates to the transmission of packets over a network, such as in a digital voice or video communication system, and more particularly to a buffer module, to a receiver, to a device and to a buffering method.

BACKGROUND OF THE INVENTION

Digital voice or audio communication systems transmit audio data enclosed in a stream of packets, or packet streams, through a network. A packet stream is generally referenced with a sequence number, which represents the position of a packet relative to another packet in the packet stream. A packet stream is also generally referenced with a timestamp to indicate the time spacing between individual packets. Different factors may affect the quality of the audio or video stream when received after transmission. One factor may be the packet loss when packet collisions occur or when the network is overloaded. A second factor may be the delay of some packets relative to other packets in the same stream, which prevents the stream being output in the right order. Packet loss and delay factors may lead to reception of packets in an incorrect order and at a non-constant rate, thereby causing packet jitter, which is another problem of known systems.

The use of a jitter buffer is a well-known solution to solve packet jitter problems. The role of the jitter buffer is to store some packets from the stream for a defined period of time in order to wait for other slower packets, and to reorder the packets from the stream based on their sequence number. Then, using the indication of timestamps for all the packets, the jitter buffer is able to output the ordered packet stream with the correct timing.

However, in some specific situations such as when the network is overloaded in a substantial and/or sudden way, the jitter buffer may be unable to solve all the packet jitter problems.

US2004002262 discloses a method relating to an acceptance window based on sequence numbers of each packet in the stream, such that the jitter buffer gains time when reading the timestamp of each packet.

U.S. Pat. No. 6,862,298 and U.S. Pat. No. 6,684,273 disclose a method relating to the adaptation of the size of the jitter buffer by correlating the delay with some predefined threshold values.

The above cited prior art documents solve some problems, but do not solve jitter problems relating to extreme conditions such as a sudden substantial change in packet delays.

SUMMARY OF THE INVENTION

The present invention provides a buffer, device, and methods as described in the accompanying claims.

BRIEF DESCRIPTION OF THE DRAWINGS

Reference will now be made, by way of example, to the accompanying drawings, in which.

DETAILED DESCRIPTION OF THE PREFERRED EMBODIMENTS

According to an example of an embodiment, there is provide a buffer module, including: a filter for determining a time stamp of an arriving data package, said time stamp identifying an expected location of said arriving data package and determining whether said expected location is inside or outside a first window having a predetermined size defined by a first and a second extreme, wherein the first window is included within a second window and for moving the first window by a predetermined distance, without changing the size of the first window, to accommodate the expected location when the expected location is outside the first window; and a buffer for storing said arriving data package in a position corresponding to the expected location.

According to a further example of an embodiment, the buffer may further include a calculator which calculates a difference between the expected location of the arriving data package and a predetermined point in the first window when the expected location is outside the first window to obtain a value for said predetermined distance.

According to a further example of an embodiment the buffer can move the first window when the difference is less than the predetermined size of the first window, to accommodate the arriving data package in the first window.

According to a further example of an embodiment, there is provided a buffer which includes a calculator for comparing the predetermined distance with the predetermined size of the first window to determine if the expected location can be included in the first window.

According to a further example of an embodiment, the buffer may further include a counter, which when said buffer module is in operation, has a counter value which is periodically incremented when the arriving data package is located in the second window in order to obtain a counter value.

According to a further example of an embodiment, the position of the first window is variable in accordance with one or more intervals associated with the second window.

According to a further example of an embodiment, the expected location is a location in time relative to the first window.

According to a further example of an embodiment the expected location is a location in space relative to the first window.

According to a further example of an embodiment the first window is restricted from movement in one or more predetermined circumstances.

According to a further example of an embodiment the one or more predetermined circumstances include reception of a DTMF signal.

According to a further example of an embodiment said buffer is inhibited from storing the arriving data package in the buffer when the arriving data package cannot be accommodated in the first window.

According to a further example of an embodiment, there is provided a receiver including a buffer module.

According to a further example of an embodiment, there is provided a device including a receiver.

According to a further example of an embodiment, there is provided a buffering method, including: determining a time stamp of an arriving data package, said time stamp identifying an expected location of said arriving data package; determining whether said expected location is inside or outside a first window having a predetermined size defined by a first and a second extreme, wherein the first window is included within a second window; moving the first window by a predetermined distance, without changing the size of the first window, to accommodate the expected location when the expected location is outside the first window; storing said arriving data package in a buffer in a position corresponding to the expected location.

By way of example, a more detailed description of examples of embodiments is provided below.

Figure 1:
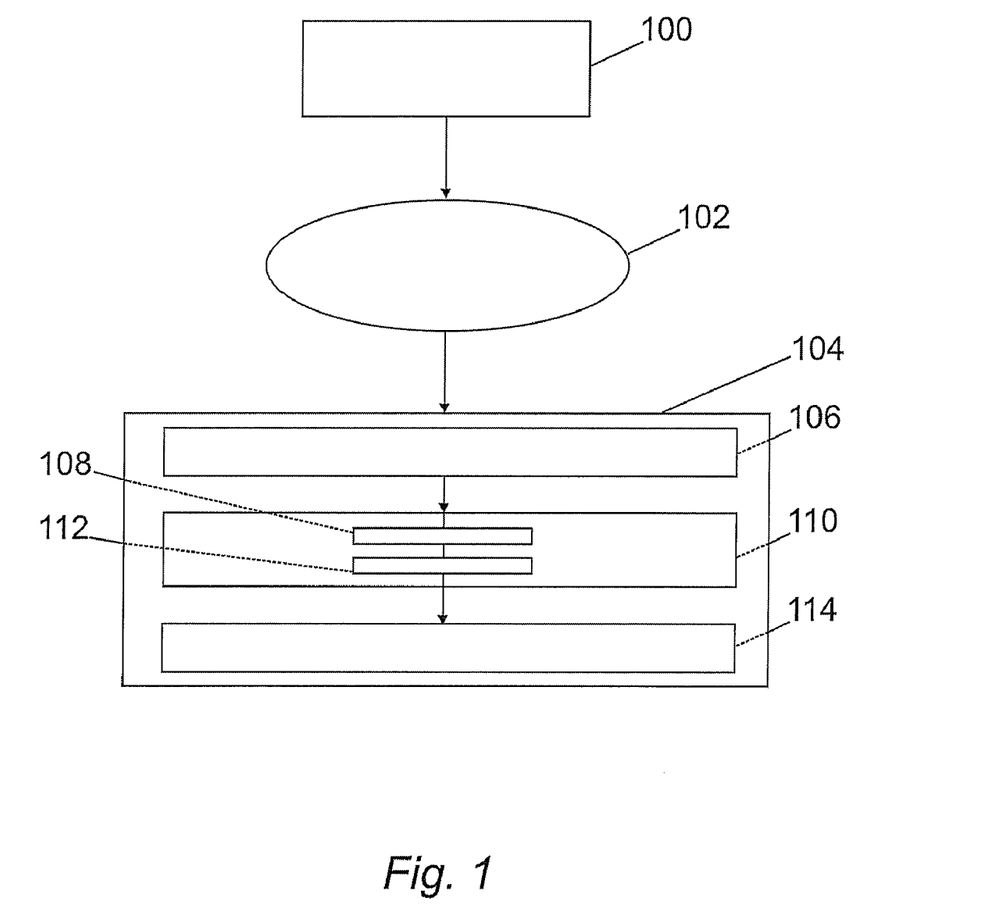
FIG. 1 is a representation of an overall system for improving jitter in accordance with a first example of an embodiment of the invention, given by way of example.

FIG. 1 shows the general configuration of a data transmission over a network such as, for example, in a digital voice or video communication system. The processed data relate to a packet stream, which comprise, for example, an audio or a video content. Each packet in the packet stream can contain one or more frames, e.g. video or audio frames, and is defined with a sequence number to indicate the relative order compared to all other packets in that stream. An example of a packet type in a real time transfer protocol (RTP) packet is described in the Internet Engineering Task Force standard RFC3550. The frame format depends on the type of vocoder used and may be as described in standard RFC3551. Based on the packet timestamp, a timestamp value is assigned to each frame included in that packet. The frame timestamp value may for example be the value of the packet timestamp for the frames in the same packet.

As shown in FIG. 1, a transmission system 100 sends packets through a network 102 to a receiving system 104. Both the transmission and receiving systems include general computer elements (not shown), for example a processor, memory, calculator etc. These may also be located in any other part of the systems, for example the buffer module etc. The receiving system 104 comprises a module 106 for processing the packets sent by the transmission system 100. The module 106 is connected to a jitter buffer module 110 (for example a jitter buffer module 110), which processes the packet jitter problem. The jitter buffer module 110 includes an adaptive filter 108, and a jitter buffer 112. The jitter buffer module 110 is connected to a module 114, which out puts the resultant packet stream. The functions of these modules will be described in greater detail below.

Although in the following, by way of example, the operation of the jitter buffer module 110 for storing frames in the jitter buffer is described, it will be apparent that the jitter buffer module 110 may store packets in the jitter buffer instead.

In use, the jitter buffer module 110 runs a specific algorithm, which comprises two phases. The first phase is the acceptance phase. The acceptance phase relates to accept the received frame into the jitter buffer. The second phase is a storage phase. The storage phase relates to the decision to store the received frame into the jitter buffer. This second phase also includes another algorithm, which relates to buffer size estimation. In the storage and acceptance phase, the jitter buffer can allow frames to be dropped.

Figure 2:
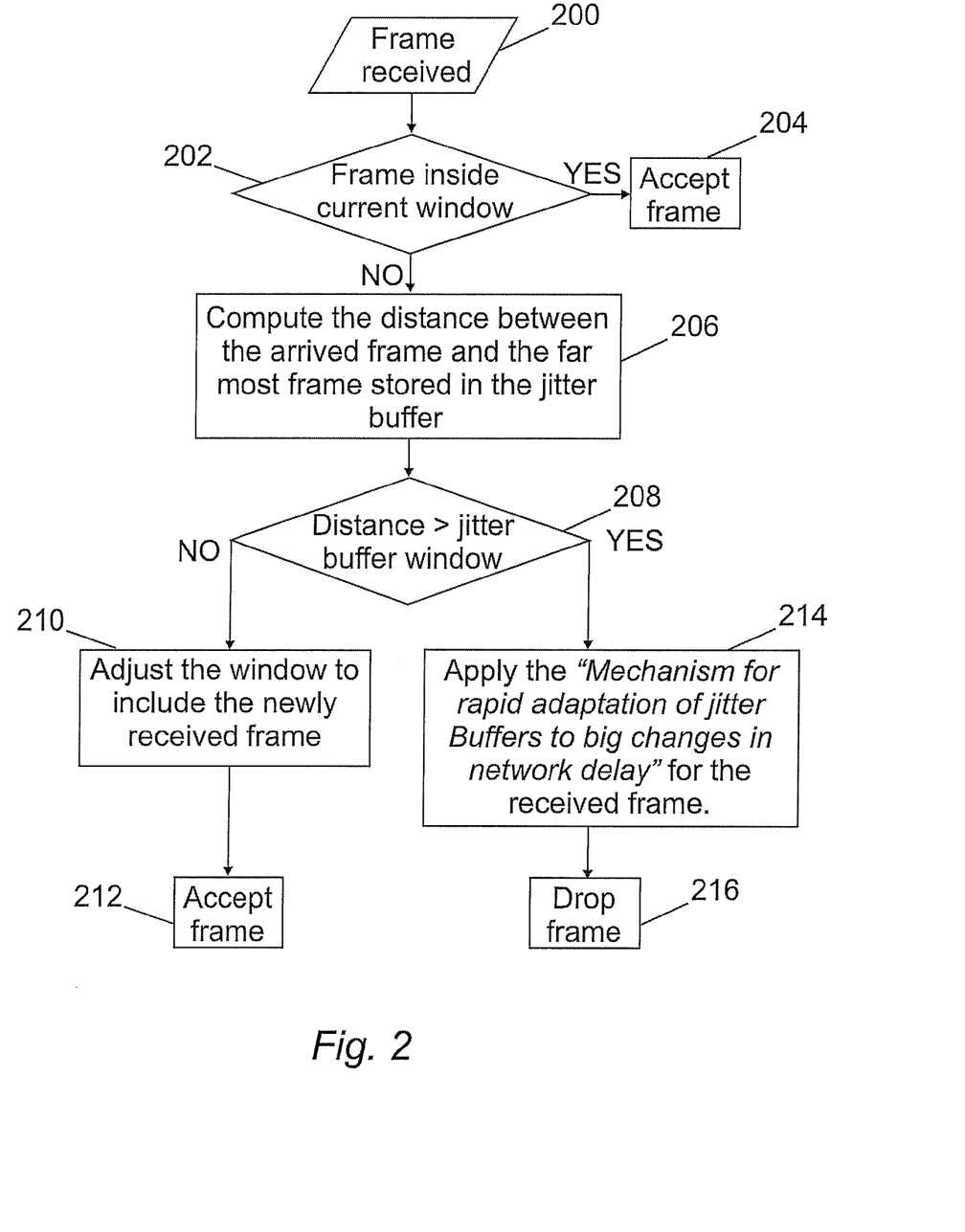
FIG. 2 is a flowchart of a method in accordance with an example of an embodiment of the invention, given by way of example.

The adaptive filter may, when the jitter module 110 is in operation, perform a process based on two algorithms, a first algorithm and a second algorithm, which are shown in FIG. 2 in the form of method steps. The first algorithm and first corresponding process make use of an active buffer window (or window concept) and the timestamp of the frame to determine which frames to accept, or not, in the jitter buffer. At the beginning of the process, in step 200, a new frame is received in the jitter buffer module from the module 106. As a window is available for any frame to be accommodated therein, the next step 202 is a check to verify if the received frame Hies inside or outside a current "active" buffer window in the jitter buffer, as will be described below. If the frame is inside the current active window, then the frame is accepted, in step 204, into the jitter buffer 112. In such a situation where the frame is inside the current active window, the second algorithm does not have to process the frame.

The second algorithm increments an internal counter of the jitter buffer in order to indicate with a counter value that the frame was received in the middle or elsewhere in the current active window. The storage phase can then proceed. If the frame is outside the current active window, then in step 206 the algorithm calculates the distance, or a time period between the received frames and the furthest already stored frame or frames, as will be described below. In step 208, the first algorithm compares the calculated distance with the length of the current active window. If the calculated distance is less than the length of the current active window, then in step 210 the first algorithm adjusts the position of the current active window to include the received frame in the current active window, and therefore to accept the frame in step 212. If the calculated distance is more than the length of the current active window, then in step 214 the second algorithm applies. At this stage, the frame is dropped as indicated at step 216. The current active window or buffer window is also referred to as the first window, as distinct from the second window which is referred to as the analysis window.

Figure 2A:
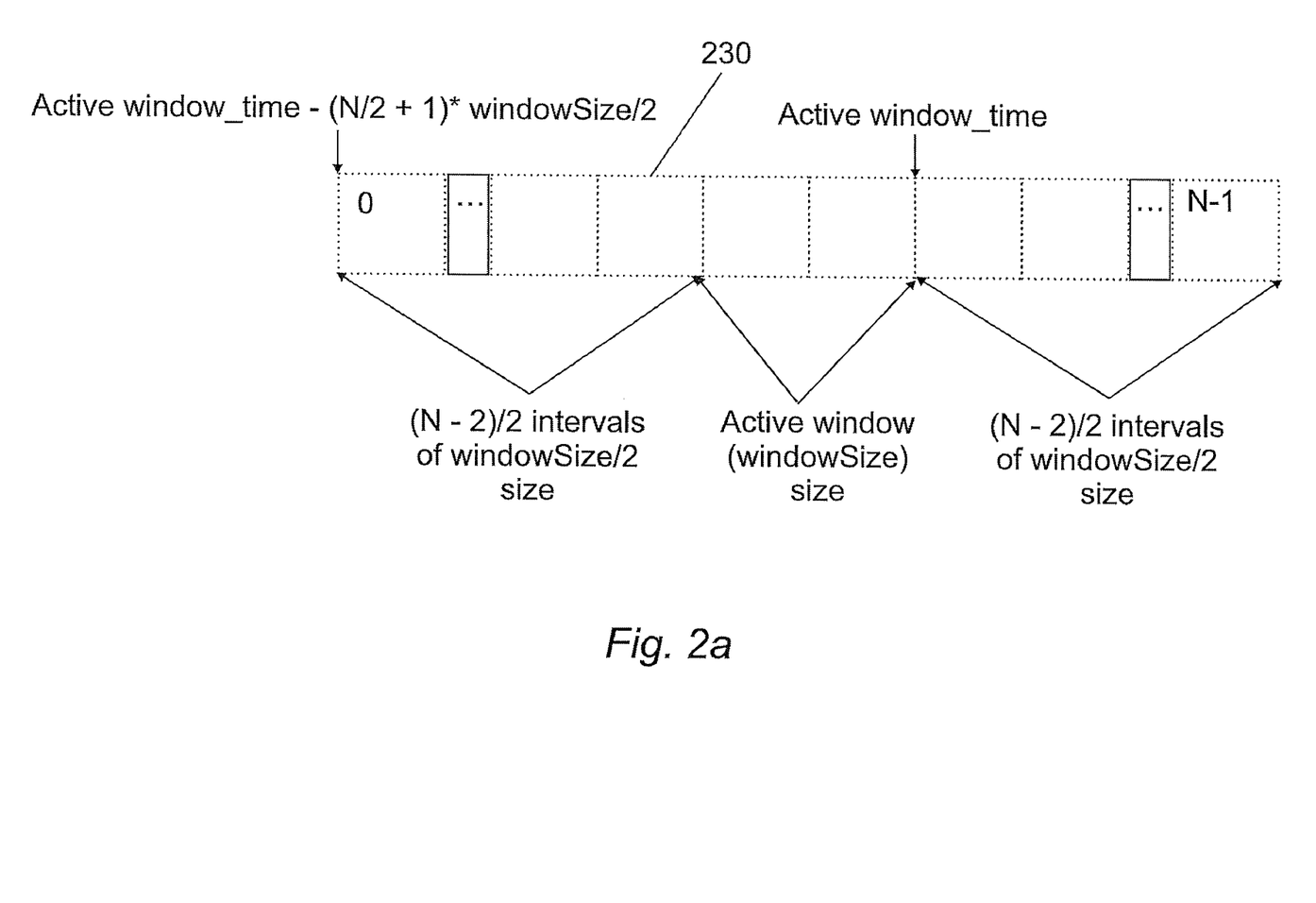
FIG. 2a is a representation of an "active" window of a buffer, such as a jitter buffer, comprising several windows of time in accordance with another example of an embodiment of the invention, given by way of example.

The second algorithm of step 214 enables definition of a larger analysis window (second window) 301 (for example lasting 5 seconds), which contains, either in the centre, or off-centre, the current active window. The specific mechanism allows the analysis window (second window) to be split into N equal size intervals 230 as shown in FIG. 2a. Each interval represents half the size of the active window size (N=analysis window size/(active window size/2)). The specific mechanism assigns a counter to each of the intervals in order to count the number of received frames falling inside each interval. Thus, the active window can be moved to accommodate the maximum possible number of frames, for example by selecting the interval with the lowest count. The counter may also be a "look around counter", which can count all the frames which fall inside each interval by analysing or "looking at" each interval The formulas written below define the location of the arriving frames. The variable JB_time or the active window time defines the current time or the furthest limit of the active window and the window size defines the size of the active window.

The arriving data frame may fall inside the interval k if the time stamp of the frame is between:

$$JB\_time-(N/2+1)*windowSize/2+k*windowSize/2$$

and $$JB\_time-(N/2+1)*windowSize/2+(k+1)*windowSize/2.$$

Different situations may occur with arriving frames. The arriving data frame may fall inside the first window. Therefore, this frame will be buffered and the corresponding counter will be updated. In another situation, the arriving frame may fall inside the second window and not in the first window. In this situation, the corresponding "look around" counter will be incremented and the frame dropped (not shown). In a further situation, the arriving frame may fall outside the second window. Therefore, the frame will be ignored and dropped. The specific mechanism allows the first window to adapt more quickly to network conditions, resulting in a better quality of the output signal. Therefore, the packet or frame loss can be reduced by running the algorithm as required. The movement of the first window buffer introduces a delay which is reduced because the repositioning of the first window is accurately processed.

A user may customize the system by setting the period for evaluating the counters. Thus, the user can specify a speed which the system has to respect to adapt to network changes. The second algorithm allows reduced system memory consumption because only relevant frames, having timestamp values relatively close to the first window buffer times, are taken into account. Frames having timestamp values outside a certain range, which may represent the first window, second window or whatever, will be ignored. Furthermore, only recent frames received in the last algorithm time period are analysed, which increases the speed of adaptation to new network conditions.

Figure 2B:
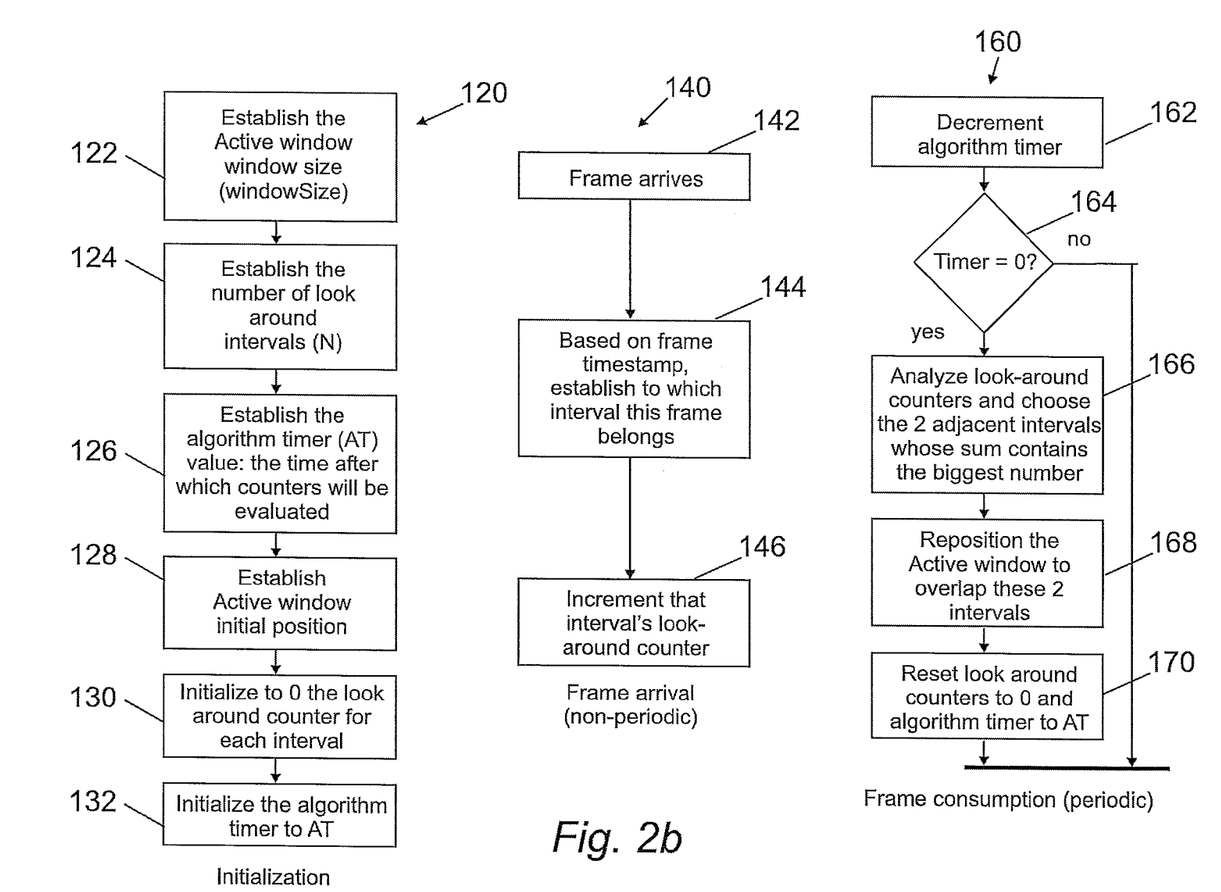
FIG. 2b is a flowchart of a method of a three part mechanism including an initialization process, a frame arrival process and a frame consumption process associated with a second algorithm in accordance with an example of an embodiment of the invention, given by way of example.

FIG. 2b is a three-part flowchart indicating an initialization process 120, a frame arrival process on a non-periodic time basis 140, and a periodic frame consumption process 160 based on the second algorithm. The initialization process includes the following steps. At step 122 the active window size is established. The number of "look around" intervals (N) is then established in step 124. Step 126 follows where the algorithm time (AT) value is established. This is the time after which the "look around" counters will be evaluated. At step 128 the first or active window initial position is established and the counter is set to zero (initially) for each interval in step 130. Then at step 132 the algorithm time is initialized.

The frame arrival process 140 commences when a frame arrives at step 142. At step 144, based on the frame timestamp an evaluation is made as to which interval the frame belongs to, and in some cases the evaluation may mean the frame is not physically inserted into the jitter buffer due to the relative positions of the first and second windows and the frame timestamp. The respective interval counter is then incremented at step 146.

The frame consumption process 160 starts at step 162 with a decrement to the algorithm timer. A determination is made at decision point 164 as to whether or not the time is equal to zero. If NO the process stops; if YES the process passes to step 166. At step 166 the "look around" counters are analyzed and two adjacent intervals are chosen such that their counters sum is the greatest. At step 168 the active window (first window) is then repositioned to overlap the two intervals identified in step 166. Finally the "look around" counters are reset to zero and the algorithm time to AT in step 170. Further details of these three processes will become evident in the description that follows.

Figure 2C:
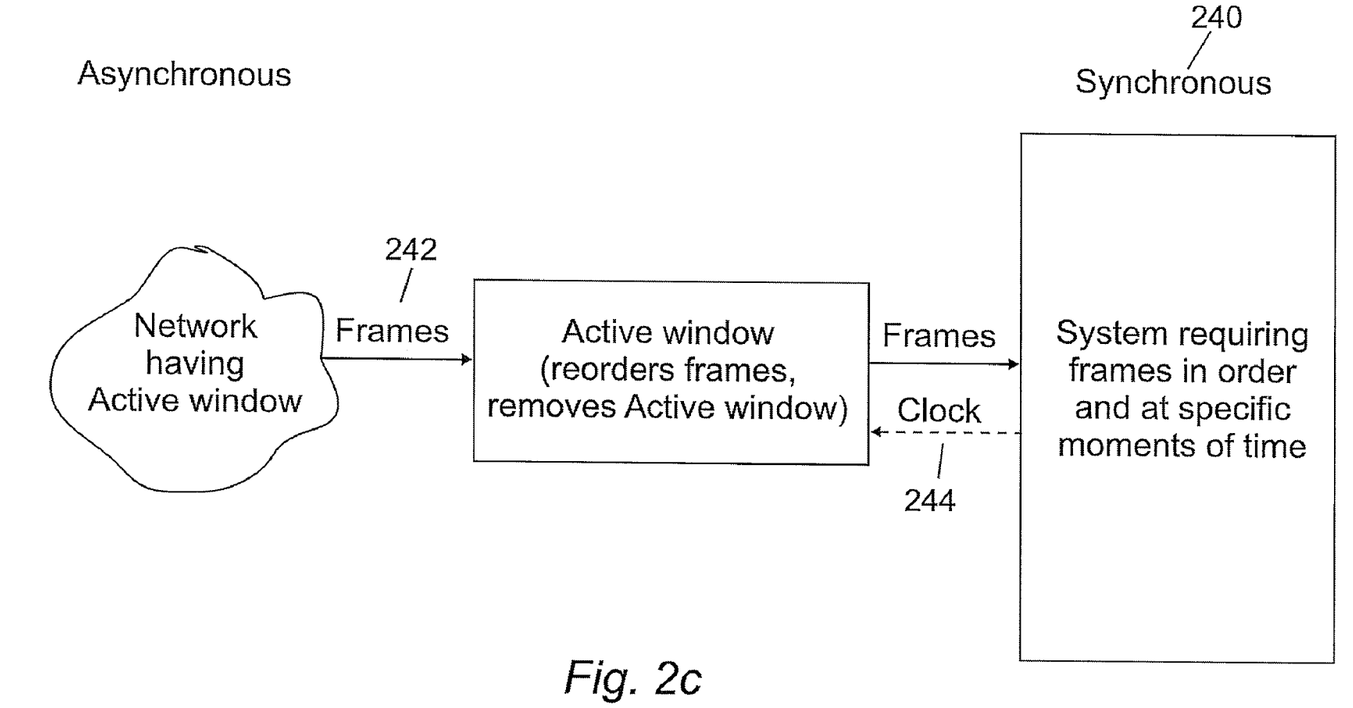
FIG. 2c is a representation of a system for reducing jitter in accordance with a further example of an embodiment of the invention given by way of example.

FIG. 2c shows a representation of the system, wherein the jitter buffer allows synchronization 240 of the original asynchronous frames 242. The jitter buffer does not need an external time and only requires an external clock signal 244. The clock can have any frequency. An internal time may be based on the clock signal. Frames can arrive from the asynchronous system 246 at any time, to be passed to the synchronous system based on the clock signal.

Thus, the size and position of the first buffer window is configurable depending on the location of the received frame and also depending on the settings of the user, as described above and below.

Additionally, it can be seen that the received frame may have an unexpected location, for example relative to the first window, in a number of different places. Examples of the different situations are shown in the FIGS. 3 to 8. In FIGS. 3 to 8, stored frames are referenced by the same references, 302, 304, 306 and 308, and a new frame is referenced by the same reference 310.

Figure 3:
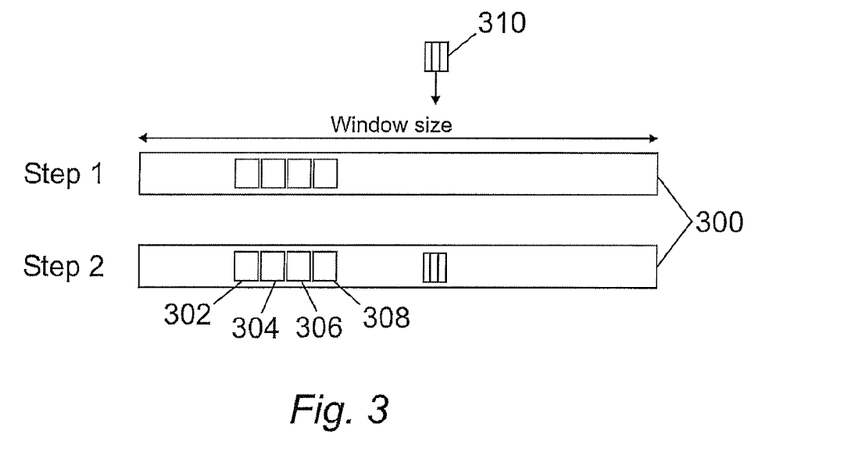
FIG. 3 is a representation of a buffer in accordance with a first stage of the process of an embodiment of the invention, given by way of example.

As shown in FIG. 3, in step 1, a first window 300 of a jitter buffer already stores frames 302, 304, 306, 308 from previous data transmissions. The jitter buffer is now receiving a new frame 310. As this new frame 310 has arrived in a position that aligns with the first window, the frame is directly received in the first window without any movement of the first window, as shown in step 2. As the frame arrives inside the first window, the corresponding look around counter is incremented to indicate that the frame was received in the first window. This information may be used later to determine if the position of the first window should be adjusted. There is no need to perform any other processes, such as window balancing, as will be described in greater detail below with respect to other examples.

Figure 4:
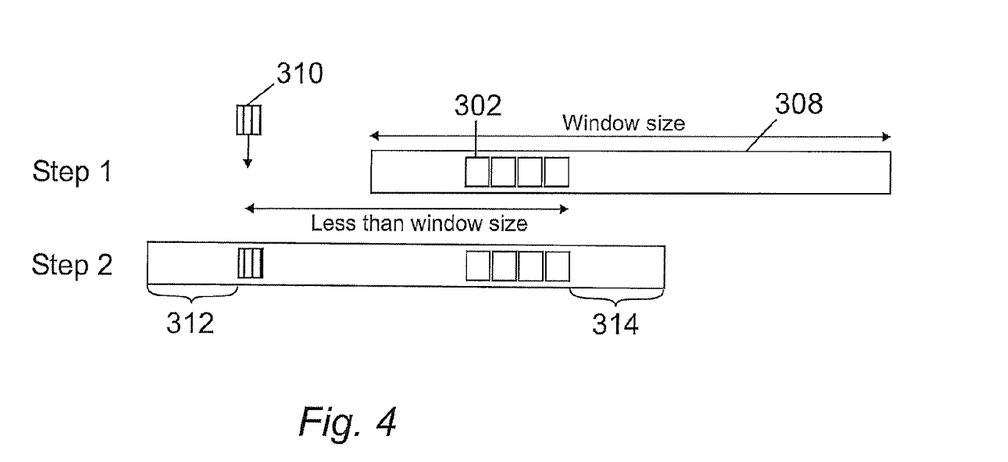
FIG. 4 is a representation of a buffer in accordance with a second stage of the process of an embodiment of the invention, given by way of example.
Figure 5:
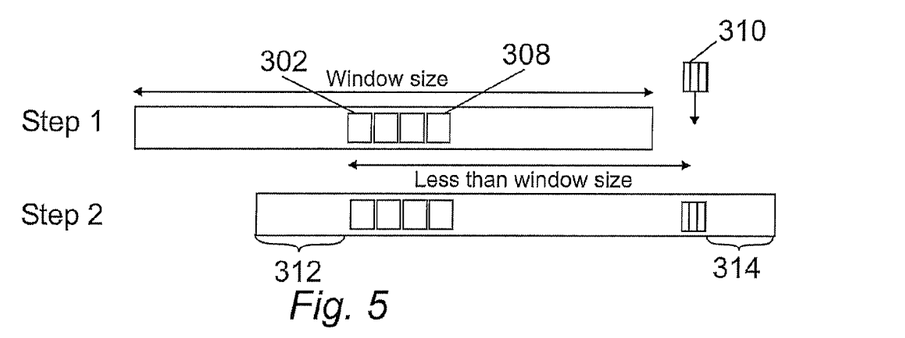
FIG. 5 is a representation of a buffer in accordance with a third stage of the process of an embodiment of the invention, given by way of example.

As shown in step 1 of FIG. 4 and in FIG. 5, the new frame 310 arrives outside the first window, which means that the algorithm calculates the distance between the new frame 310 and one of the stored frames, for example 302 or 308, these frames being located the furthest from the new frame. In the situation of FIG. 4 and FIG. 5, the distance is less than the length of the first window. Thus, the jitter buffer can accept the new frame in the first window by moving said window to the left i.e. decreasing the upper and lower threshold of the window in FIG. 4, or by moving it to the right, i.e. increasing the upper and lower threshold of the window in FIG. 5 (as shown in step 2 of both FIG. 4 and FIG. 5). The first window is subjected to an additional process in order to balance the remaining time lengths 312 and 314 in the active first window. The time length 312 refers to the time length between the end of the first window and the new received frame at one side of the first window, i.e. the left side in FIG. 4 and the right side in FIG. 5. The time length 314 refers to the time length between the end of the first window and the furthest stored frame at another side of the first window, i.e. the right side in FIG. 4 and the left side in FIG. 5. Thus, the process of balancing allows the first window to have the same remaining time length at each side of the first window as shown in step 2 of FIG. 4 and FIG. 5.

Figure 6:
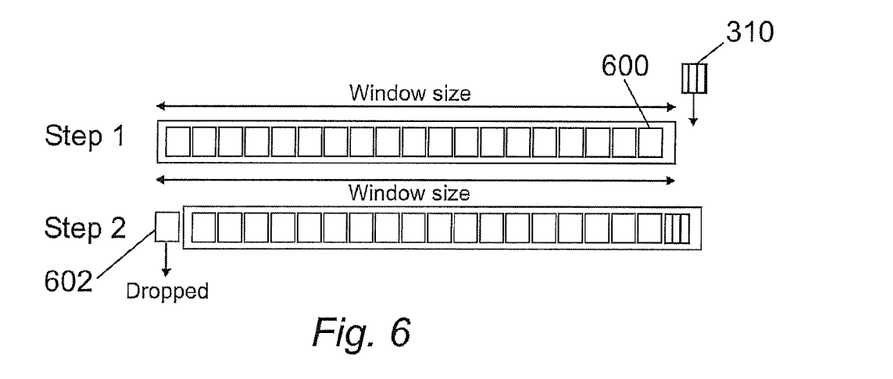
FIG. 6 is a representation of a buffer in accordance with a fourth stage of the process of an embodiment of the invention, given by way of example.

As shown in FIG. 6, the situation of a clock drift may occur. In this situation, the arriving frame 310 arrives at a time which is significantly out of sequence with the receipt of other frames and should be in a location directly after the last frame 600 in the first window i.e. in the second window. However, the first window is full of other frames and as such the process for receiving frame 310 is different. In the case of frame 602 being at the opposite end of the first window, the frame is dropped to allow the first window to move by one frame position to accommodate the incoming frame 310. The system may then feed back the dropped frame 602 in an attempt to accommodate this frame at a later point. This feedback may require temporary storage of the dropped frame 602 and subsequent reintroduction of that frame at step 200 in the flowchart of FIG. 2.

Figure 7:
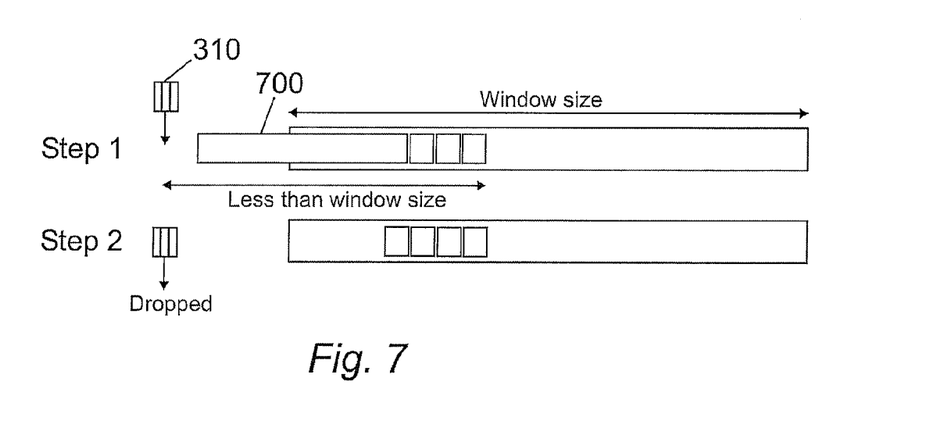
FIG. 7 is a representation of a buffer in accordance with a fifth stage of the process of an embodiment of the invention, given by way of example.

As shown in FIG. 7, the situation of the buffer handling specific signalling may also occur. In certain situations, for example, a-dual tone multi-frequency (DTMF) tone may arrive. Certain rules relate to the type of signalling which may influence the method of the present invention. The arrival of a DTMF tone 700 in the first window restricts the ability of the first window to be moved to accommodate frames outside the current first window position. Accordingly in this case, when frame 310 arrives the first window cannot be moved to accommodate it due to the presence of the DTMF tone 700. As a result, frame 310 is dropped. The system may then feed back the dropped frame in an attempt to accommodate the frame at a later point. For example, the dropped frame may temporarily be stored and then reintroduced at step 200 in the flowchart of FIG. 2.

Figure 8:
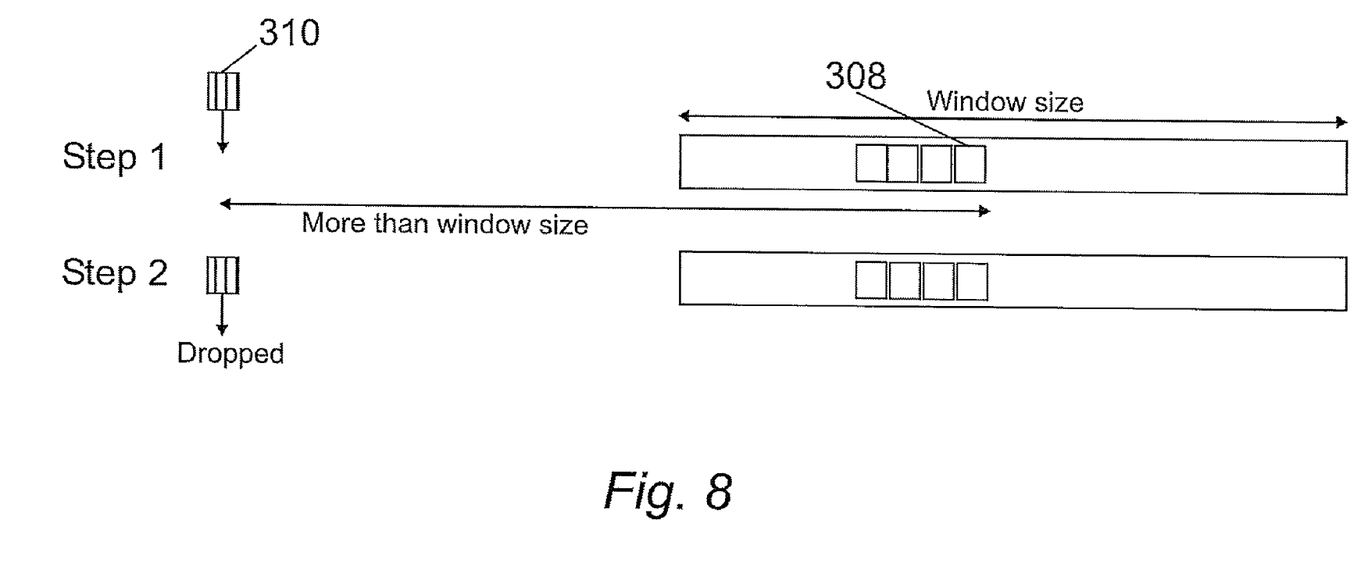
FIG. 8 is a representation of a buffer in accordance with a sixth stage of the process of an embodiment of the invention, given by way of example.

As shown in FIG. 8, in step 1 the new frame 310 arrives outside the first window. The algorithm then calculates the time length between the new frame and the furthest stored frame, for example 308. In the present situation, the calculated time length is more than the time length of the first window. Then the second algorithm applies, the corresponding look around counter is incremented (only if the packet is falling inside the second window) and the jitter buffer has to drop the packet. As mentioned above, the system may then feed back the dropped frame in an attempt to accommodate the frame at a later point. For example the dropped frame may temporarily be stored and then reintroduced at step 200 in the flowchart of FIG. 2.

Figure 9:
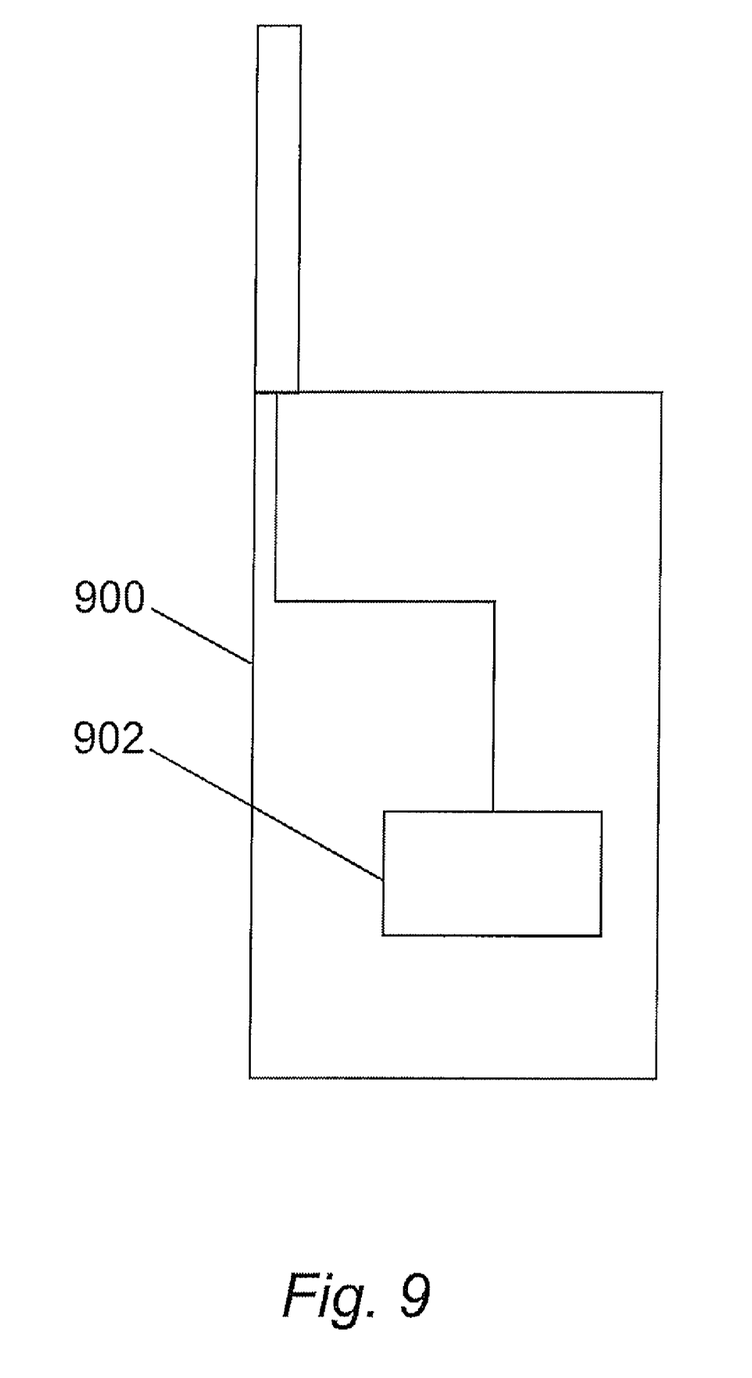
FIG. 9 is a representation of a device including a buffer, in accordance with an embodiment of the invention, given by way of example.

FIG. 9 shows a mobile phone 900 which includes a buffer 902 in accordance with any embodiment of the present invention. Similarly the buffer could be included in any other appropriate device (not shown per se).

The modified acceptance phase of the algorithm of the jitter buffer avoids a significant loss of frames by having a filter comprising a dynamic and adaptive acceptance window (also referred to as the active buffer or the first window). Thus, in the case of sudden and significant changes of jitter in the received frames, i.e. when "jittered" frames are received outside the first window, the present invention can provide a means and a mechanism for maximising the acceptance and minimising the rejection of arriving frames. Also, the modified algorithm in the jitter buffer only selects the relevant frames, based on the available memory of the jitter buffer, to process them in the storage phase. The present invention reduces the number of situations where, in case of sudden and significant changes of the jitter in the received frames, the size estimator algorithm of the prior art makes slow or erroneous decisions to accept or reject a frame.

It should be noted that the invention has been described with reference to the accommodation of frames in the buffer. It will be appreciated that the invention could also apply to the accommodation of packets. Also frames and packets are both packages of data which are capable of moving through a network, generally at respective different layers of the network. Accordingly, the invention could in fact apply to any packages of data from any layer or origin in the network and is not restricted to packets and frames.

In the foregoing specification, the invention has been described with reference to specific examples of embodiments of the invention. It will, however, be evident that various modifications and changes may be made therein without departing from the broader spirit and scope of the invention, as set forth in the appended claims.

It will be appreciated that the examples described above relate to a jitter buffer and applications relating to audio and video signals, and that the invention could be applied to other types of buffer and other types of signalling.

Additionally, the invention is not limited to physical devices or units implemented in non-programmable hardware but can also be applied in programmable devices or units able to perform the desired device functions by operating in accordance with suitable program code. Furthermore, the devices may be physically distributed over a number of apparatus, while functionally operating as a single device.

Moreover, devices functionally forming separate devices may be integrated in a single physical device. For example, the circuit of the invention may be associated within a mobile telephone, personal computer or other appropriate device.

However, other modifications, variations and alternatives are also possible. Accordingly, the specifications and drawings are to be regarded in an illustrative rather than in a restrictive sense.

In the claims, any reference signs placed between parentheses shall not be construed as limiting the claim. The word "comprising" does not exclude the presence of elements or steps other than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A device, comprising:
   a filter for determining a time stamp of an arriving data package, said time stamp identifying an expected location of said arriving data package and determining whether said expected location is inside or outside a first window having a predetermined size defined by a first time and a second time, wherein the first window is included within a second window and for moving the first window by a predetermined amount of time, without changing the size of the first window, to accommodate the expected location when the expected location is outside the first window;
   a buffer for storing said arriving data package in a position corresponding to the expected location; and
   a calculator which calculates a difference between the expected location of the arriving data package and a predetermined point in the first window when the expected location is outside the first window to obtain a value for said predetermined distance;
   wherein the buffer can move the first window when the difference is less than the predetermined size of the first window, to accommodate the arriving data package in the first window and balance the first window to have the same remaining time length between the first time and the new arriving data package at one side of the first window and between the second time and a furthest stored data package at another side of the first window.

2. A device as claimed in claim 1, wherein the buffer includes a calculator for comparing the predetermined amount of time with the predetermined size of the first window to determine if the expected location can be included in the first window.

3. A device as claimed in claim 1, including a counter, which when said device is in operation, has a counter value which is periodically incremented when the arriving data package is located in the second window in order to obtain a counter value.

4. A device as claimed in claim 3, wherein the position of the first window is variable in accordance with one or more intervals associated with the second window.

5. A device as claimed in claim 4, wherein the second window comprises N intervals, each interval representing half the size of the size of the first window, N being an integer value, and having an interval counter counting a number of received data packages falling inside each interval.

6. A device as claimed in claim 5, wherein the first window is moved to accommodate a maximum possible number of packages depending on the interval counter values.

7. A device as claimed in claim 1, where the expected location is a location in time relative to the first window.

8. A device as claimed in claim 1, where the expected location is a location in space relative to the first window.

9. A device as claimed in claim 1 wherein the first window is restricted from movement in one or more predetermined circumstances.

10. A device as claimed in claim 9, wherein the one or more predetermined circumstances include reception of a DTMF signal.

11. A device as claimed in claim 1, wherein said buffer is inhibited from storing the arriving data package in the buffer when the arriving data package cannot be accommodated in the first window.

12. A receiver including a device as claimed in claim 1.

13. A device including a receiver according to claim 12.

14. A buffering method, including:
   determining a time stamp of an arriving data package, said time stamp identifying an expected location of said arriving data package;
   determining whether said expected location is inside or outside a first window having a predetermined size defined by a first time and a second time, wherein the first window is included within a second window;
   moving the first window by a predetermined amount of time, without changing the size of the first window, to accommodate the expected location when the expected location is outside the first window;
   storing said arriving data package in a buffer in a position corresponding to the expected location;
   calculating a difference between the expected location of the arriving data package and a predetermined point in the first window when the expected location is outside the first window to obtain a value for said predetermined distance;
   moving the first window when the difference is less than the predetermined size of the first window, to accommodate the arriving data package in the first window; and
   balancing the first window to have the same remaining time length between the first time and the new arriving data package at one side of the first window and between the second time and a furthest stored data package at another side of the first window.

15. A non-transitory computer readable medium comprising instructions that when executed on a programmable apparatus performs the steps comprising:
   determining a time stamp of an arriving data package, said time stamp identifying an expected location of said arriving data package;
   determining whether said expected location is inside or outside a first window having a predetermined size defined by a first time and a second time, wherein the first window is included within a second window;
   moving the first window by a predetermined amount of time, without changing the size of the first window, to accommodate the expected location when the expected location is outside the first window;
   storing said arriving data package in a buffer in a position corresponding to the expected location;
   calculating a difference between the expected location of the arriving data package and a predetermined point in the first window when the expected location is outside the first window to obtain a value for said predetermined distance;
   moving the first window when the difference is less than the predetermined size of the first window, to accommodate the arriving data package in the first window; and
   balancing the first window to have the same remaining time length between the first time and the new arriving data package at one side of the first window and between the second time and a furthest stored data package at another side of the first window.

16. A device as claimed in claim 2, including a counter, which when said device is in operation, has a counter value which is periodically incremented when the arriving data package is located in the second window in order to obtain a counter value.

17. A device as claimed in claim 2, where the expected location is a location in time relative to the first window.

18. A device as claimed in claim 2, where the expected location is a location in space relative to the first window.

19. A device as claimed in claim 3 wherein the first window is restricted from movement in one or more predetermined circumstances.

20. A device as claimed in claim 3, wherein the one or more predetermined circumstances include reception of a DTMF signal.

* * * * *